United States Patent
Blum et al.

(10) Patent No.: US 8,332,459 B2
(45) Date of Patent: Dec. 11, 2012

(54) FEDERATION OF COMPOSITE APPLICATIONS

(75) Inventors: Michael Blum, Aidlingen (DE); Peter Fischer, Filderstadt-Bonlanden (DE); Hendrik Haddorp, Holzgerlingen (DE); Stefan Hepper, San Jose, CA (US); Stefan Liesche, Boeblingen (DE); Michael Marks, Kirchheim-Teck (DE); Thomas Stober, Boeblingen (DE)

(73) Assignee: International Business Machines Corporation, Armonk, NY (US)

( * ) Notice: Subject to any disclaimer, the term of this patent is extended or adjusted under 35 U.S.C. 154(b) by 769 days.

(21) Appl. No.: 12/388,648

(22) Filed: Feb. 19, 2009

(65) Prior Publication Data

US 2009/0217287 A1 Aug. 27, 2009

(30) Foreign Application Priority Data

Feb. 26, 2008 (EP) .................................... 08151918

(51) Int. Cl.
G06F 15/16 (2006.01)
(52) U.S. Cl. ........ 709/201; 709/208; 709/217; 709/220; 709/223
(58) Field of Classification Search .................. 709/201, 709/208, 217, 220, 223
See application file for complete search history.

(56) References Cited

U.S. PATENT DOCUMENTS

| 8,019,632 B2* | 9/2011 | Niheu et al. ................. 705/7.11 |
| 2007/0067373 A1* | 3/2007 | Higgins et al. ................ 707/206 |
| 2007/0250629 A1* | 10/2007 | Blanding et al. .............. 709/226 |
| 2009/0172635 A1* | 7/2009 | Auriemma et al. ........... 717/107 |
| 2010/0223629 A1* | 9/2010 | Appelbaum et al. .......... 719/318 |

\* cited by examiner

*Primary Examiner* — Lan-Dai T Truong
(74) *Attorney, Agent, or Firm* — Patents on Demand P.A.; Brian K. Buchheit; Scott M. Garrett

(57) ABSTRACT

A predetermined business task of a composite application can be fulfilled. The composite application can include a set of components. The composite application is instantiated by a template means and a predefined collaborative context module controls the interaction of the set of components during the runtime of the composite application. A set of components fulfilling individual services on individual different server systems is leveraged by the composite application. During the instantiation of the composite application from a template, the referenced components (as types) are instantiated leading to runtime instances of these components. The interaction of the different components is controlled on individual different server systems utilizing a primary context module. The primary context module communicates with an appropriate collaborative module implemented locally on the respective set of servers, where the local context modules act as secondary context modules in relation to the primary context modules. For each of the secondary context modules, local components communicate to control the interaction of components.

15 Claims, 7 Drawing Sheets

PRIOR ART FIG. 3

Interaction (Instantiate)

FIG. 5

Primary Controller Management

| Component ID | Server location | type |
|---|---|---|
| SAP Account Manager | Sap.mycom.com | SAP Container |
| Domino Customer DB | Domino.mycom.com | Notes API |
| Portal Web Interface Portlet | Portal.mycom.com | JSR286 API |

The primary controller manages the components on the remote systems. This is done based on a mapping table, which specifies server location and type each component.

FIG. 7

FEDERATION OF COMPOSITE APPLICATIONS

CROSS-REFERENCE TO RELATED APPLICATION

This application claims the benefit of European Patent Application No. filed 26 Feb. 2008, which is assigned to the assignee of the present application, and the teachings of which are hereby incorporated by reference in their entirety.

BACKGROUND

The present invention relates to the field of networked applications and, more specifically, to federation of composite applications.

FIG. 1 (Prior Art) shows an overview of the components that build up the prior art application infrastructure (AI) 11 and system architecture within an overall portal system 10. The application infrastructure includes templating application infrastructure (TAI) 13, composite application infrastructure (CAI) 15, component registry 27, and portal handler 29.

TAI 13 can handle the templates in the system and the creation of new composite applications. CAI 15 can handle the application instances 19 during runtime and can manage connections and the data flow between the components of an application. The component registry 27 can manage the business components installed in the system. The portal handler 29 can be a specific local component that manages any portal related artifacts 8, such as pages and/or portlets for the application infrastructure in the portal. The portal handler 29 can be used by the instantiation component 17 to create such artifacts during the creation of a new composite application.

As shown, TAI component 13 manages the templates 23 in the system which contains references to instantiable components in a local list of components 27. As an example, a template for shopping applications can consist of a reference to a document library component which is used to hold the available goods and their descriptions, a shop portlet that lets clients process actual shopping transactions, an invoice business component that handles the payment process, and a blogging component that allows clients to comment on their satisfaction.

The TAI component 13 also creates application instances from templates via an instantiation component 17, which creates separate instances of the referenced business components, typically by creating or copying individual configurations for these components such that multiple application instances can be created from the same template without interfering with each other.

For the above mentioned sample template, the instantiation 17 can, among other things, create an individual storage compartment in the document library, an individual configuration of the invoice component referring to the bank account, and an individual configuration for the shop portlet. The configuration for the shop portlet can be set up to display goods from the created document library and can be used to delegate payment processing to the created invoice component instance.

In particular, the instantiation 17 creates the necessary portal artifacts such as pages that allow users to interact with the created composite application. This is typically done by employing a specific handler 29 that creates portal artifacts 8 and links them with the business components of the application.

The created composite application instances 19 hold a context 25 that lists the component instances that make up the composite application.

FIG. 2 (Prior Art) shows an overview of the storage components involved in the portal architecture 10 that comprises deployment related code in a deployment component 14 and a runtime environment in one or more runtime containers 12 where the deployed components are executed. For the composite application context deployed artifacts can include application components stored in a component registry 18 and/or templates stored in a template catalog 20. This data can be referenced by the application's instance specific data 16.

Prior art composite applications are a key concept of the prior art "Service Oriented Architecture" (SOA). They allow end-users to assemble business logic out of a set of given components without programming by simply defining some meta information, such as configuration data and application structure.

Prior art composite applications are supported for example by the prior art IBM WEBSPHERE PORTAL and other known products.

A key element in supporting any desired services oriented architecture is giving business analysts the ability to implement complex logic using pre-built components. The components can be assembled to a coherent "composite application", which can be developed, deployed, managed, and used as a single entity, rather than managing the included components individually.

Prior art composite applications are executed in a runtime container, which adds capabilities, such as management of application specific access control, templating, communities, roles, and the like.

While servlet/portlet containers in prior art focus on individual components and how they render User Interface (UI) information, the composite application container is adding management capabilities in prior art. This concept is, for instance, introduced by the prior art IBM WEBSPHERE PORTAL.

One conceptual disadvantageous limitation which exists is that all components need to be executed on the same server and in the same application runtime container. This disadvantage requires all components to be used within a composite application to be installed on one and the same local server system. If remote information is needed, a local "proxy" business component needs to be written and integrated in the application. The prior art proxy component imports such remote information by implementing Web services. For example, a request is sent to a remotely installed application, which receives and processes the request and sends back a response which is processed by a control container of the composite application.

A prior art composite application consists of independent components which are set together to build a union which performs some predefined business tasks as a whole. Disadvantageously, all components need to be installed at one and the same application server.

With reference to FIG. 3 (Prior Art) showing a prior art system architecture for prior art use of composite applications, a complex composite application can span multiple systems, denoted as 32, 34 and 36, for example a system A having a portal composite application infrastructure 31, system B 34 being a Systems Applications and Products (SAP) system, and system C being for example a DOMINO server system, for example for an application of LOTUS NOTES. In each of the shown systems 32, 34 and 36 a plurality of components are installed, symbolized by the puzzle-like parts in each system, wherein each component runs in its own runtime container.

According to this prior art there is no possibility to virtually execute the components in a single composite application runtime environment. Instead, programmers need inevitably to write "gluecode" for the business components which connect the various systems and the interaction of the components. This can be an error-prone work, which is additionally quite complicated and requires much programming knowledge, in particular knowledge about Systems A, B, C runtime environments. This gluecode forms a remote access, for example, from System A to System B and System C in order to cooperate and communicate with the components implemented there. The mainly used implementation is based on Web requests or on remote procedure calls.

BRIEF SUMMARY

A predetermined business task of a composite application can be fulfilled. The composite application can be a set of components. The composite application is instantiated by a template means and a predefined collaborative context module controls the interaction of the set of components during the runtime of the composite application. A set of components fulfilling individual services on individual different server systems is generated. During the runtime of the components, the interaction of the different components is controlled on individual different server systems utilizing a primary context module. The primary context module communicates with an appropriate collaborative module implemented locally on the respective set of servers, where the local context modules act as secondary context modules in relation to the primary context modules. For each of the secondary context modules, local components communicate to control the interaction of components.

BRIEF DESCRIPTION OF THE DRAWINGS

FIG. 5 is an interaction diagram illustrating the basic steps of an embodiment of the present invention occurring during an instantiation of a composite application.

FIG. 7 is a schematic depiction of the basic contents of a mapping table used by a central controller component controlling the interaction in accordance with an embodiment of the inventive arrangements disclosed herein.

DETAILED DESCRIPTION

Figure 1:
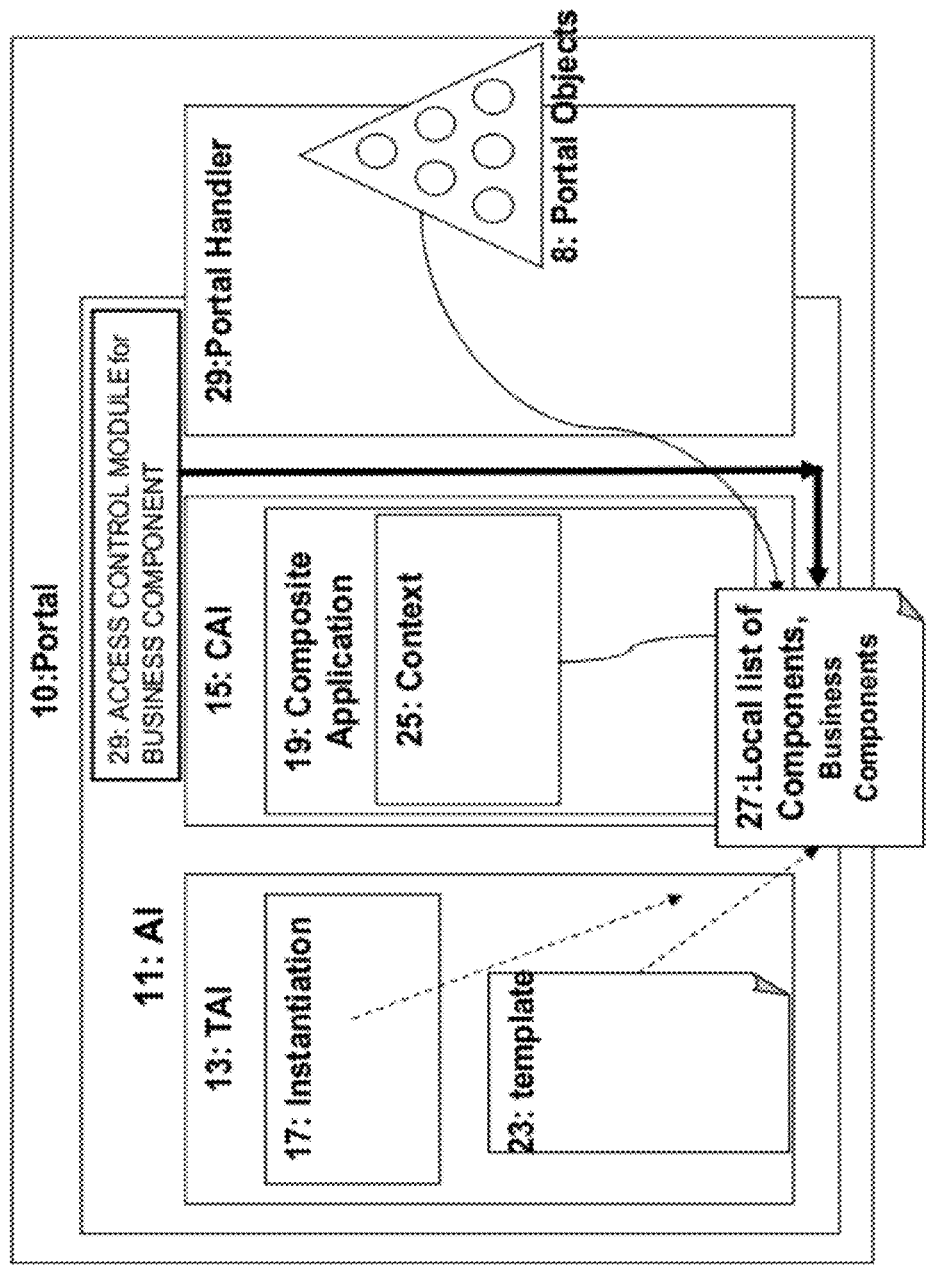
FIG. 1 (Prior Art) shows an overview of components of a prior art application infrastructure.
Figure 2:
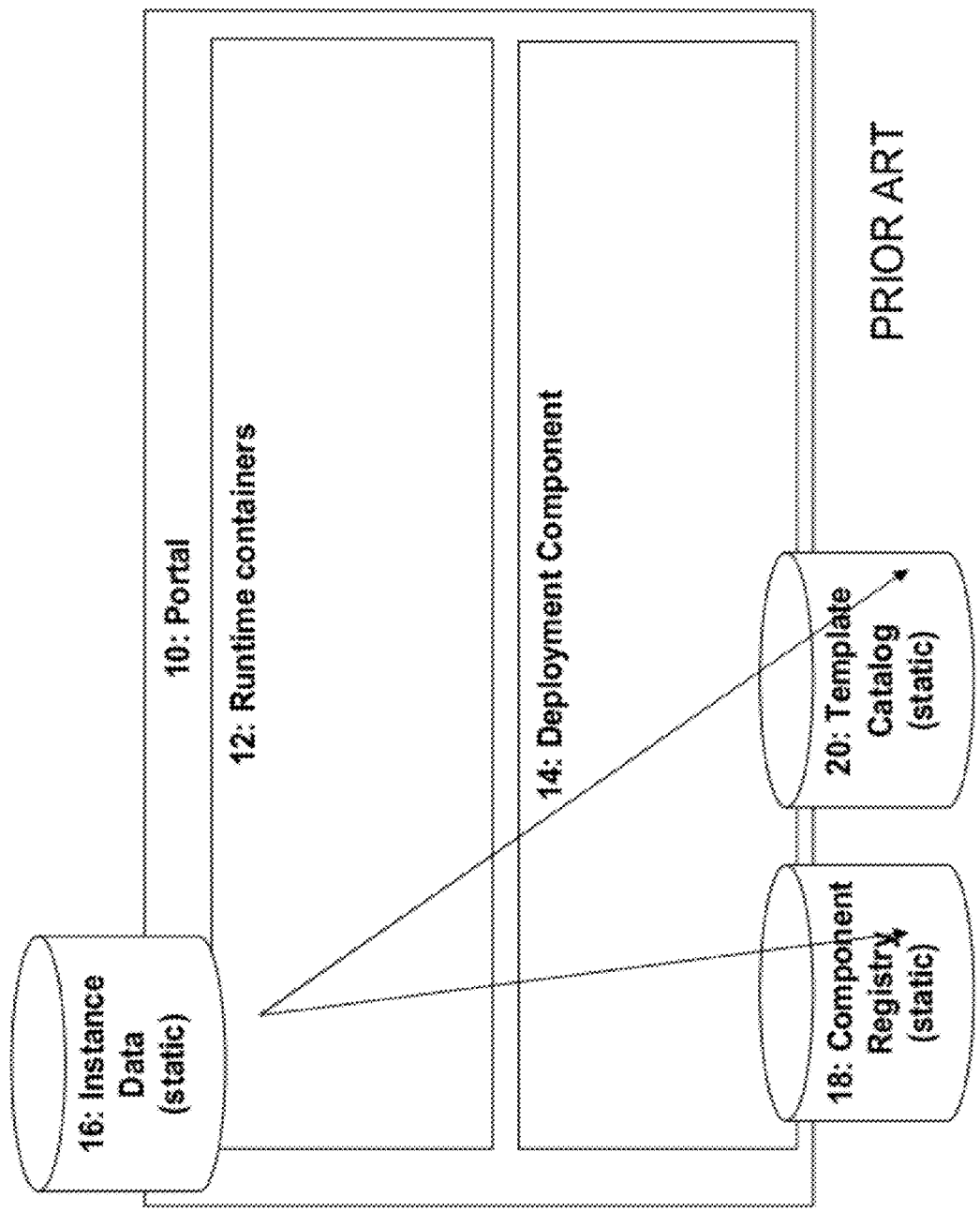
FIG. 2 (Prior Art) shows an overview of the storage components involved in a portal architecture.

The term "composite application" can define an application hosted on a Web portal platform which is built by combining and connecting multiple components such as portlets, wikis, document libraries, and Web services, for a particular purpose such as a shop or a virtual team room application. A single portal platform can host multiple instances of the same composite application, for example different team rooms for different associated user communities. Composite applications are built from a template describing the contained components, configuration, and interconnection.

An embodiment of the disclosure provides a solution to virtualize a set of different runtime environments, and to provide a centralized control component on a portal application server, which coordinates the interaction between different systems and different components installed on respective systems, in order to generate a single composite application which spans across the before mentioned multiple server systems and runtime environments.

Thus, a composite application is defined which is able to span across different server systems. As such, components from these different server systems (for example portal server systems) can be integrated into a single composite application. Properties of "points of variability", templating, application roles, and the like can be available for this new type of composite application, which spans different server systems.

In one embodiment, external components, which may require their own runtime environment, can be advantageously used for this new type of integrated composite application. By this, it is possible to integrate different programming worlds into the new type of composite application without knowing the details of each programming world. The central control component implements all interface logic in order to handle the control of incoming and outgoing data.

When non-homogeneous runtime environments and respective components are integrated into one composite application, this composite application has a far more extended scope of functionality, because virtually all functionality existing on these different systems can be imported into the composite application.

In one embodiment, multiple systems can all have the same runtime environment and host the same type of applications. The composite application can perform load balancing tasks using these different systems. This aspect is, for example, very useful when the composite applications offer a user interface for using broadband media libraries, where a single user request triggers a relatively high network load. When a large set of such user requests must be processed, the load can be adequately distributed and thus balanced amongst the different available separate systems.

The term "components" which is used to describe programmatic resources on the different separate server computer systems is to be understood basically as a program component fulfilling a relatively clear and simple business task, for example processing emails. It should be noted, however, that the disclosed technique is also capable by means of the same features to extend this definition to also include program components having a larger functional scope, such as for example to include not only processing of emails, but also processing of contacts, calendar function, to-do-schedules, and the like.

The present disclosure addresses a problem that occurs when a composite application is desired to integrate different programming "worlds". Such is the situation when a single composite application uses for example a Systems Applications and Products (SAP) component, running on a SAP server, further uses a media library, which streams media data, and uses finally a database intensively which is basically implemented on a third server by using a third different programming environment. In the disclosure, a composite application can integrate multiple applications running each in their own, original runtime environment.

Figure 3:
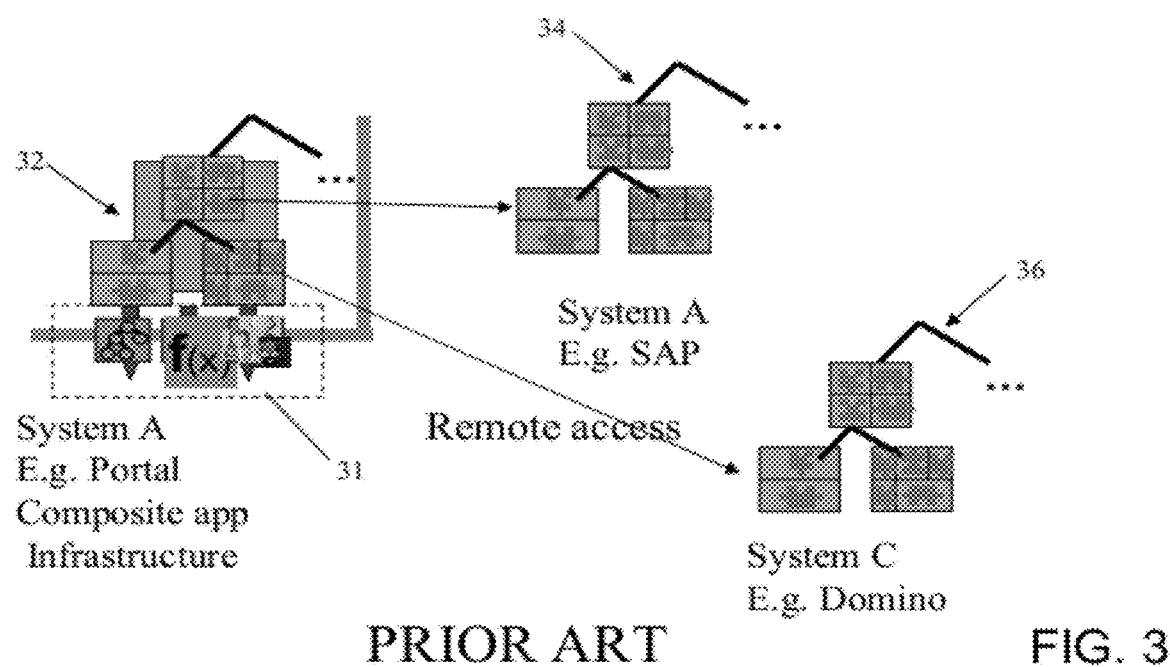
FIG. 3 (Prior Art) is a schematic diagram illustrating a high level system view reduced to the components of a prior art portal environment.
Figure 4:
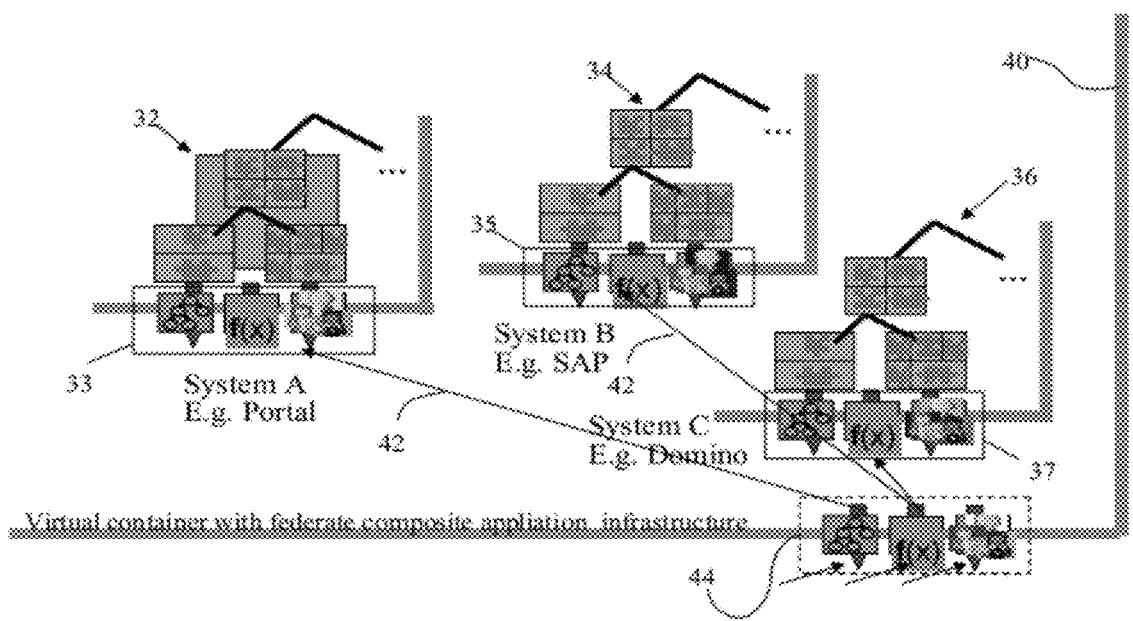
FIG. 4 is a depiction of a computing system illustrating an embodiment of the present invention.

With general reference to the Figures and with special reference now to FIG. 4, a new virtual container denoted with reference 40 is given according to this embodiment of the invention, which comprises a federate composite application infrastructure symbolized by frame 44 and also referred to as "primary context module" 44. This virtual container 40 implements and performs control of all interaction required between the components as they are denoted with the same reference signs as given in FIG. 3.

According to the principal aspect of the present invention a single, virtual composite application infrastructure is provided which spans multiple systems 32, 34 36, as shown in FIG. 4, wherein individual components can be executed within their native environment on which they are deployed. When the components run individually on separate systems, they are managed as part of a single composite application. As such, they do not need to be contacted by a Web request as it is done in prior art. Instead they are accessed—see arrows 42—through a "virtual" composite application infrastructure layer, comprised of control components 33, 35, 37, also referred to in here and implemented as "collaborative context modules" or "secondary context module" implemented locally on a respective system.

This virtual environment exposed functionality which is featured by the application and its components such as adding a member, setting a preference, reading data, displaying information and the like. The environment maps that functionality transparent to the user of the composite application to the components and to the appropriate individual system, on which that component is deployed. This can be done by remote procedure calls, Web services, Service Oriented Architecture (SOA)/Service Component Architecture (SCA) protocols, Web Services for Remote Portlets (WSRP) protocols, and the like.

The virtual environment 40 supports the management and configuration, as well as the interaction of the components as they are described already with reference to FIG. 3, here however, across the different systems, without the need of developing the above mentioned gluecode or without the need to write individual business components. The components can leverage features provided by the composite application infrastructure, such as parameterizations, application roles, or template instantiation immediately.

In the depicted example of FIG. 4, the virtual composite application environment 40 spans thus a portal system 32, a DOMINO system 36 and a SAP system 34.

Figure 5:
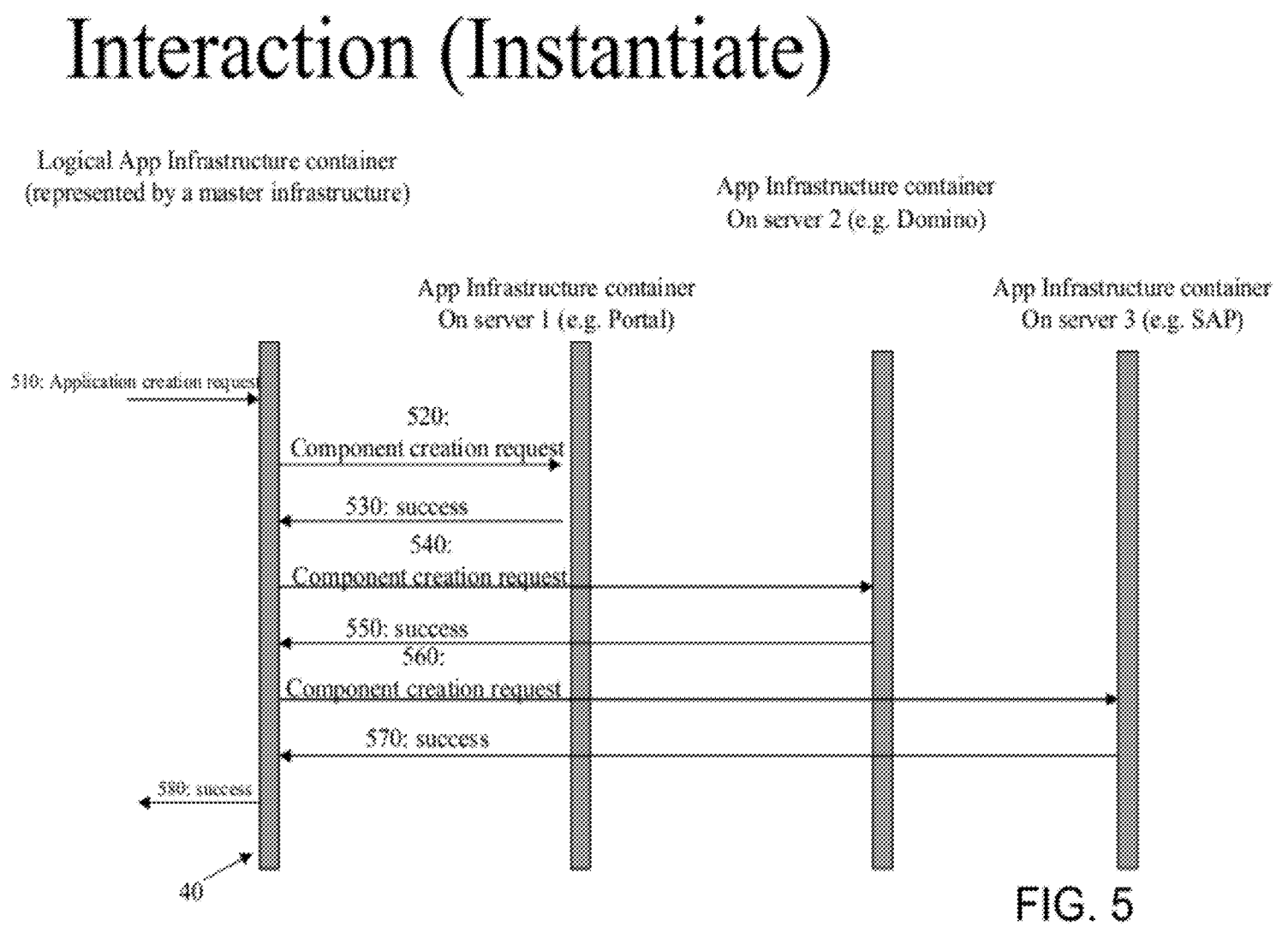

With further reference to FIG. 5 the interaction between the depicted components is described during the instantiation of the composite application in accordance with an embodiment of the disclosed invention.

In FIG. 5, an instantiation request for an application instance is sent to the master container. This container infrastructure triggers component instance creation requests for each of the different system environments. During instantiation it can be ensured that each created component can be linked to the cross-system overall application.

In more detail, a logical application infrastructure container, which is denoted by reference sign 40 in FIG. 4 receives a request for creating a composite application, which is shown by step 510. This request can be triggered by invoking an API exposed by the templating capability of the virtual composite application infrastructure.

In a next step 520, this container 40 triggers one or more "component instance creation" requests for each system environment. This is depicted by arrows 520, 540 and 560. Respective success notifications 530, 550, 570, 580 are sent back to the Application Infrastructure Container.

Figure 6:
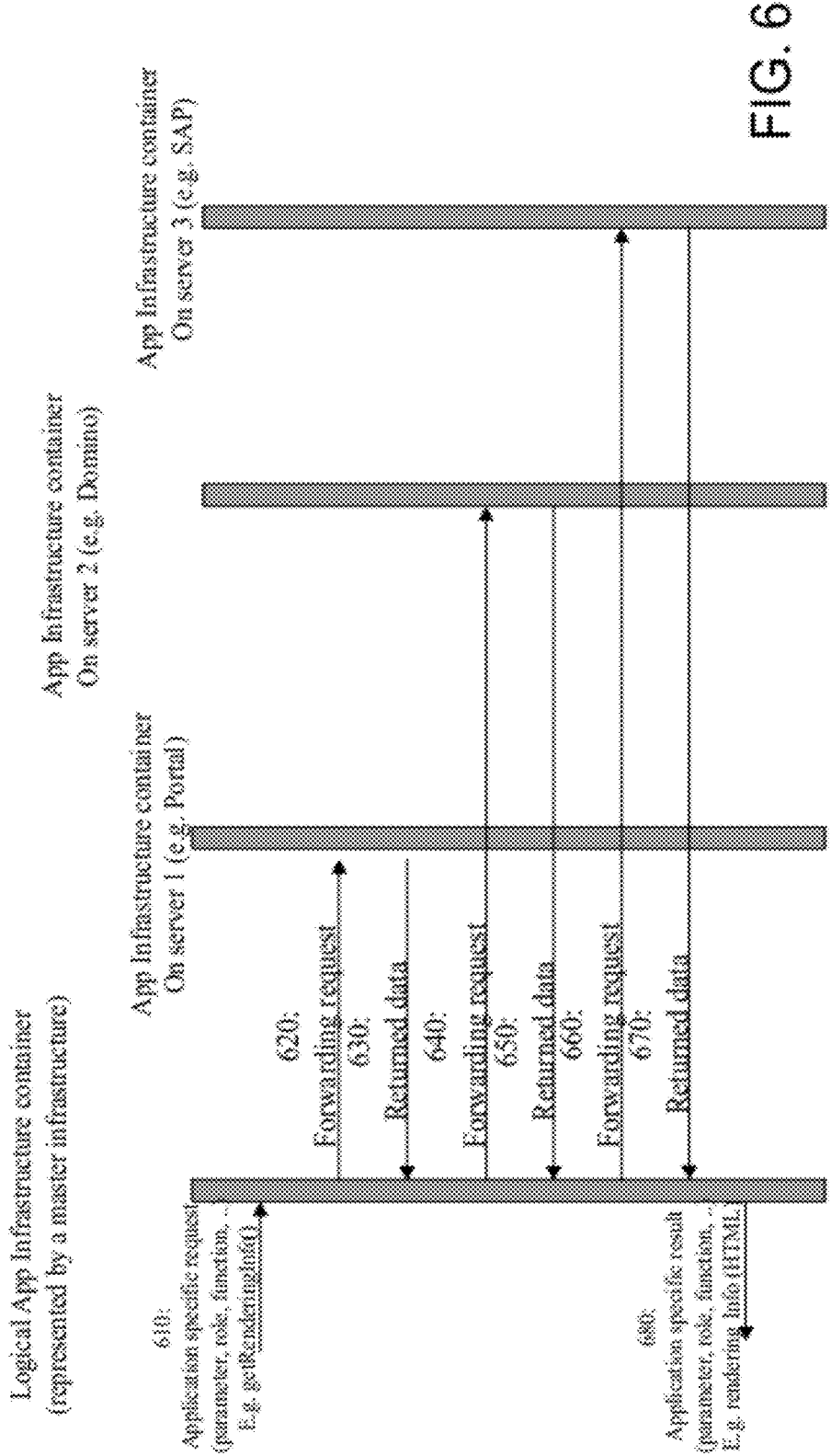
FIG. 6 illustrates basic steps during runtime of the composite application in accordance with an embodiment of the inventive arrangements disclosed herein.

With further reference to FIG. 6 the interaction between the depicted components is described during runtime of the composite application in accordance with an embodiment of the disclosed invention.

In FIG. 6, normal usage of the application is performed by sending requests to the master container such as for example to render, to get members, to add data, to doBackup, to doCustomThings. These requests can be forwarded to each component. Each component can execute component specific actions, once triggered by a specific request and return data. In more detail, the logical application infrastructure container, which is denoted by reference sign 40 in FIG. 4 receives an application specific request for one of beforementioned tasks, which is shown by step 610.

In a next step 620 this container 40 triggers the "Forwarding" request or several of them for each system environment. This is depicted by arrows 620, 640 and 660. Respective application specific data are calculated by the respective application on its original system environment, and are sent back to the Application Infrastructure Container, see steps 630, 650, 670, 680. These result data are then available for the container and the primary controller, respectively.

A primary controller manages the components on the remote systems. This can be done based on a mapping table, which specifies the server location and the type of each component.

A typical application, which exploits the described capabilities and spans multiple systems, can include components to be executed for example within a SAP system, a DOMINO System and a Portal system. Each system contains some of the components, which belong to the overall application. Each component is managed by the overall application, but is executed within its native environment. The component, which retrieves data from a SAP repository can be implemented to exploit SAP Application Programming Interfaces (APIs), whereas the Portal components can be implemented to be based on the Portlet Java Specification Request 168 (JSR168) API. Domino components can use the native NOTES C/C++ APIs. Each component can expose its capabilities to the composite application infrastructure (e.g., by exposing Web services or remote procedure call).

Benefits resulting from use of multiple native environments are retained, while keep environment specific code and APIs to each individual component largely unchanged. The overall application implements the business value based generic services by consuming Web services. However, despite of loading environment specific code, the virtual composite application allows to manage all pieces (even the ones executed remotely) as one single entity, which represents the entire business application.

Additionally, components of the same composite application can span multiple systems for load balancing purposes. For instance, it is possible to offload individual portlets which consume significant computing power.

It should be noted that in applications based on prior art, composite applications and the composite application infrastructure are limited to a single environment. There is no prior art method of managing components of a single composite application, on multiple systems.

The invention can take the form of an entirely hardware embodiment, an entirely software embodiment or an embodiment containing both hardware and software elements. In one embodiment, the invention is implemented in software, which includes but is not limited to firmware, resident software, microcode, and the like.

Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code can include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, and the like) can be coupled to the system either directly or through intervening I/O controllers.

Network adapters can also be coupled to the system to enable the data processing system to become coupled to other data processing systems or remote printers or storage devices through intervening private or public networks. Modems, cable modem and Ethernet cards are just a few of the currently available types of network adapters.

What is claimed is:

1. A method for operating a composite application comprising:
   instantiating a composite application wherein the composite application is configured to fulfill business tasks by virtually leveraging a set of components that reside across different server systems having non-homogeneous runtime environments, where the virtually leveraging implements without developing gluecode for controlling interactions between the set of components that reside across the different servers systems, wherein each of the different server systems comprise a locally executing secondary context module, and wherein the composite application comprises a primary context module which implements as interface logic in order to handle incoming and outgoing data to and from the secondary context modules of the different server systems during runtime execution of the composite application;
   controlling interaction of the components during runtime utilizing said primary context module;
   said primary context module communicating at runtime with the secondary context modules; and
   each of the secondary context modules communicating with local components of one of the different server systems for controlling interactions of the local components related to the composite application.

2. The method according to claim 1, wherein said different server systems implement functional components, each performing respective different business tasks.

3. The method according to claim 1, wherein said different server systems implement functional components performing the same business tasks, and wherein a load meter is implemented that communicates with the primary context module for determining a point in time to switch load from one to another system in order to balance a load between the different server systems.

4. The method according to claim 1, wherein said primary context module is implemented in a portal server system.

5. The method according to claim 3, wherein a specific server system of the different server systems is selected by the primary context module according to at least one criterion of the involved business task comprising of a member of the following criteria:
   cost;
   security; and
   bandwidth.

6. An electronic data processing system for operating a composite application, said electronic data processing system comprising:
   at least one processor; and
   one or more memory elements connected to the at least one processor, wherein the one or more memory elements store program code, wherein the at least one processor is operable to execute the program code stored in the one or more memory elements to cause the electronic data processing system to:
   instantiate a composite application, wherein the composite application is configured to fulfill business tasks by virtually leveraging a set of components that reside across different server systems having non-homogeneous runtime environments, where the virtually leveraging implements without developing gluecode for controlling interactions between the set of components that reside across the different servers systems, wherein each of the different server systems comprise a locally executing secondary context module, and wherein the composite application comprises a primary context module which implements as interface logic in order to handle incoming and outgoing data to and from the secondary context modules of the different server systems during runtime execution of the composite application,
   control interaction of the components during runtime utilizing said primary context module;
   communicate via a said primary context module at runtime with the secondary context modules; and
   communicate via each of the secondary context modules with local components of one of the different server systems for controlling interactions of the local components related to the composite application.

7. The system according to claim 6, wherein said different server systems implement functional components, each performing respective different business tasks.

8. The system according to claim 6, wherein said different server systems implement functional components performing the same business tasks, and wherein a load meter is implemented that communicates with the primary context module for determining a point in time to switch load from one to another system in order to balance a load between the different server systems.

9. The system according to claim 6, wherein said primary context module is implemented in a portal server system.

10. The system according to claim 8, wherein a specific server system of the different server systems is selected by the primary context module according to at least one criterion of the involved business task comprising of a member of the following criteria:
    cost;
    security; and
    bandwidth.

11. A computer program product for operating a composite application embedded on a non-transitory computer usable medium, said computer program product comprising:
- computer usable program code configured to instantiate a composite application wherein the composite application is configured to fulfill business tasks by virtually leveraging a set of components that reside across different server systems having non-homogeneous runtime environments, where the virtually leveraging implements without developing gluecode for controlling interactions between the set of components that reside across the different servers systems, wherein each of the different server systems comprise a locally executing secondary context module, and wherein the composite application comprises a primary context module which implements as interface logic in order to handle incoming and outgoing data to and from the secondary context modules of the different server systems during runtime execution of the composite application;
- computer usable program code configured to control interaction of the components during runtime utilizing said primary context module;
- computer usable program code configured to communicate via a said primary context module at runtime with the secondary context modules; and
- computer usable program code configured to communicate via each of the secondary context modules with local components of one of the different server systems for controlling interactions of the local components related to the composite application.

12. The computer program product according to claim 11, wherein said different server systems implement functional components, each performing respective different business tasks.

13. The computer program product according to claim 11, wherein said different server systems implement functional components performing the same business tasks, and wherein a load meter is implemented that communicates with the primary context module for determining a point in time to switch load from one to another system in order to balance a load between the different server systems.

14. The computer program product according to claim 11, wherein said primary context module is implemented in a portal server system.

15. The computer program product according to claim 13, wherein a specific server system of the different server systems is selected by the primary context module according to at least one criterion of the involved business task comprising of a member of the following criteria:
- cost;
- security; and
- bandwidth.

* * * * *